(12) United States Patent
Zhao

(10) Patent No.: US 10,334,034 B2
(45) Date of Patent: Jun. 25, 2019

(54) VIRTUAL MACHINE LIVE MIGRATION METHOD, VIRTUAL MACHINE DEPLOYMENT METHOD, SERVER, AND CLUSTER SYSTEM

(71) Applicant: Huawei Technologies Co., Ltd., Shenzhen (CN)

(72) Inventor: Yanbin Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 904 days.

(21) Appl. No.: 14/531,484

(22) Filed: Nov. 3, 2014

(65) Prior Publication Data

US 2015/0052254 A1 Feb. 19, 2015

Related U.S. Application Data

(63) Continuation of application No. PCT/CN2012/083312, filed on Oct. 22, 2012.

(30) Foreign Application Priority Data

May 4, 2012 (CN) .......................... 2012 1 0137244

(51) Int. Cl.
*H04L 29/08* (2006.01)
*G06F 9/455* (2018.01)
(Continued)

(52) U.S. Cl.
CPC ........ *H04L 67/101* (2013.01); *G06F 9/45558* (2013.01); *G06F 9/4856* (2013.01);
(Continued)

(58) Field of Classification Search
CPC . H04L 67/101; G06F 9/4856; G06F 9/45558; G06F 2009/4557; G06F 11/3433; G06F 2201/81; G06F 2201/815
See application file for complete search history.

(56) References Cited

U.S. PATENT DOCUMENTS 7,203,944 B1 * 4/2007 van Rietschote ... G06F 9/45533
718/1
8,479,294 B1 * 7/2013 Li ........................... G06F 21/56
726/23
(Continued)

FOREIGN PATENT DOCUMENTS

CN 101504620 A 8/2009
CN 102158386 A 8/2011
(Continued)

*Primary Examiner* — Oanh Duong
(74) *Attorney, Agent, or Firm* — Slater Matsil, LLP

(57) ABSTRACT

A virtual machine live migration method includes: acquiring load information of physical machines in a first physical machine group, where the physical machines share a same access switch; determining a source physical machine and a destination physical machine according to a first dynamic resource scheduling policy and the load information of the physical machines; and delivering a migration instruction to the source physical machine according to a second dynamic resource scheduling policy. In the foregoing method, virtual machine live migration is performed preferentially within a physical machine group so that network traffic of the migration passes through only one access switch. This shortens a length of a data transmission link, increases a migration rate, and relieves impact of migration traffic on network load in a cluster.

20 Claims, 12 Drawing Sheets

(51) Int. Cl.
*G06F 9/48* (2006.01)
*G06F 11/34* (2006.01)

(52) U.S. Cl.
CPC .. *G06F 11/3433* (2013.01); *G06F 2009/4557* (2013.01); *G06F 2201/81* (2013.01); *G06F 2201/815* (2013.01)

(56) References Cited

U.S. PATENT DOCUMENTS

| | | | | |
|---|---|---|---|---|
| 2008/0163239 | A1* | 7/2008 | Sugumar | G06F 9/5088 718/105 |
| 2010/0017515 | A1* | 1/2010 | Nishiguchi | G06F 9/5077 709/226 |
| 2010/0250824 | A1* | 9/2010 | Belay | G06F 9/45558 711/6 |
| 2010/0306381 | A1* | 12/2010 | Lublin | G06F 15/16 709/226 |
| 2011/0047554 | A1* | 2/2011 | Lakshmanan | G06F 9/5088 718/105 |
| 2011/0161695 | A1* | 6/2011 | Okita | G06F 1/3209 713/310 |
| 2011/0194563 | A1 | 8/2011 | Shen et al. | |
| 2012/0030335 | A1* | 2/2012 | Machida | G06F 11/1438 709/223 |
| 2012/0054409 | A1* | 3/2012 | Block | G06F 11/1484 711/6 |
| 2012/0260019 | A1* | 10/2012 | Malaiyandisamy | G06F 9/5077 711/6 |
| 2012/0278571 | A1* | 11/2012 | Fleming | G06F 9/455 711/162 |
| 2012/0297307 | A1* | 11/2012 | Rider | G06F 11/3433 715/736 |
| 2013/0047153 | A1* | 2/2013 | Emaru | G06F 3/0607 718/1 |
| 2013/0055254 | A1* | 2/2013 | Avasthi | G06F 9/45533 718/1 |
| 2013/0080809 | A1* | 3/2013 | Lu | G06F 1/206 713/322 |
| 2013/0160003 | A1* | 6/2013 | Mann | G06F 9/5088 718/1 |
| 2013/0219297 | A1* | 8/2013 | Soundararajan | G06F 8/38 715/752 |
| 2013/0227127 | A1* | 8/2013 | Takano | G06F 9/5044 709/224 |
| 2013/0238786 | A1* | 9/2013 | Khesin | H04L 67/34 709/224 |
| 2013/0339956 | A1* | 12/2013 | Murase | G06F 9/505 718/1 |

FOREIGN PATENT DOCUMENTS

| | | |
|---|---|---|
| CN | 102333037 A | 1/2012 |
| CN | 102404412 A | 4/2012 |
| CN | 102724277 A | 10/2012 |

* cited by examiner

VIRTUAL MACHINE LIVE MIGRATION METHOD, VIRTUAL MACHINE DEPLOYMENT METHOD, SERVER, AND CLUSTER SYSTEM

This application is a continuation of International Application No. PCT/CN2012/083312, filed on Oct. 22, 2012, which claims priority to Chinese Patent Application No. 201210137244.5, filed on May 4, 2012, both of which are hereby incorporated by reference in their entireties.

TECHNICAL FIELD

The present invention relates to the field of communications, and in particular, to a virtual machine live migration method, a virtual machine deployment method, a server, and a cluster system.

BACKGROUND

Virtual clustering brings multiple physical machines into unified management. It abstracts physical resources into a pool formed by various resources such as storage resources, computing resources, and network resources by means of a virtualization technology, where virtual machines request resources on demand and are deployed onto physical machines of a cluster system. A virtual machine live migration technology is a technology which migrates a virtual machine from one physical machine to another physical machine by means of live migration while ensuring that a service is not interrupted.

In the prior art, by performing real-time live migration of virtual machines in a cluster, deployment of a large number of virtual machines on physical machines can be adjusted, so as to implement dynamic load balancing within a scope of the cluster and improve resource utilization efficiency of physical machines. However, execution of live migration of a virtual machine brings extra load (load on a network, a memory, a processor and the like) to a cluster. For example, live migration of a virtual machine may require migration of dozens or even hundreds of gigabytes of virtual machine images between physical machines. As a result, the live migration of the virtual machine causes a great impact on network load in a cluster.

SUMMARY

Embodiments of the present invention provide a virtual machine live migration method, a virtual machine deployment method, a server and a cluster system so as to relieve impact of virtual machine live migration on network load in a cluster.

A virtual machine live migration method provided by an embodiment of the present invention includes: acquiring load information of physical machines in a first physical machine group, where the physical machines in the first physical machine group share a same access switch; determining a source physical machine and a destination physical machine in the first physical machine group according to a first dynamic resource scheduling policy and the load information of the physical machines in the first physical machine group, where the source physical machine is a physical machine whose load information exceeds a first threshold, and the destination physical machine is a physical machine whose load information is lower than a second threshold, where the first threshold is higher than the second threshold; and delivering a migration instruction to the source physical machine according to a second dynamic resource scheduling policy, where the migration instruction includes an identifier of a virtual machine to be migrated and an identifier of the destination physical machine, so that the source physical machine migrates, according to the migration instruction, a virtual machine on the source physical machine and corresponding to the identifier of the virtual machine to be migrated to the destination physical machine corresponding to the identifier of the destination physical machine, so as to make load information of the destination physical machine lower than the first threshold after the virtual machine on the source physical machine is accepted, and make load information of the source physical machine lower than the first threshold after the virtual machine is migrated.

A virtual machine deployment method provided by an embodiment of the present invention includes: acquiring load information of physical machines in all physical machine groups that share a same aggregation switch; determining a destination physical machine in all physical machine groups according to a first dynamic resource scheduling policy and the load information of the physical machines, where the destination physical machine is a physical machine whose load information is lower than a second threshold; and delivering, according to a deployment policy, a deployment instruction for deploying one or more virtual machines to the destination physical machine, so that the destination physical machine deploys a virtual machine according to the deployment instruction, so as to make load information of the destination physical machine on which the virtual machine is deployed lower than a first threshold, where the first threshold is higher than the second threshold.

A server provided by an embodiment of the present invention includes: an acquiring unit, configured to acquire load information of physical machines in a first physical machine group, where the physical machines in the first physical machine group share a same access switch; a determining unit, configured to determine a source physical machine and a destination physical machine in the first physical machine group according to a first dynamic resource scheduling policy and the load information of the physical machines in the first physical machine group, where the source physical machine is a physical machine whose load information exceeds a first threshold, and the destination physical machine is a physical machine whose load information is lower than a second threshold, where the first threshold is higher than the second threshold; and a sending unit, configured to deliver a migration instruction to the source physical machine according to a second dynamic resource scheduling policy, where the migration instruction includes an identifier of a virtual machine to be migrated and an identifier of the destination physical machine, so that the source physical machine migrates, according to the migration instruction, a virtual machine on the source physical machine and corresponding to the identifier of the virtual machine to be migrated to the destination physical machine corresponding to the identifier of the destination physical machine, so as to make load information of the destination physical machine lower than the first threshold after the virtual machine on the source physical machine and corresponding to the identifier of the virtual machine to be migrated is accepted, and make load information of the source physical machine lower than the first threshold after the virtual machine is migrated.

A server provided by an embodiment of the present invention includes: an acquiring unit, configured to acquire load information of physical machines in all physical machine groups that share a same aggregation switch; a determining unit, configured to determine a destination physical machine in all physical machine groups according to a first dynamic resource scheduling policy and the load information of the physical machines, where the destination physical machine is a physical machine whose load information is lower than a second threshold; and a deployment instruction sending unit, configured to deliver, according to a deployment policy, a deployment instruction for deploying one or more virtual machines to the destination physical machine, so that the destination physical machine deploys a virtual machine according to the deployment instruction, so as to make load information of the destination physical machine on which the virtual machine is deployed lower than a first threshold, where the first threshold is higher than the second threshold.

A cluster system provided by an embodiment of the present invention includes multiple physical machine groups, where the cluster system further includes the foregoing server, where the server has a communications connection with each physical machine in the multiple physical machine groups.

It can be learned from the foregoing technical solutions that, according to the virtual machine live migration method, virtual machine deployment method, server and cluster system provided by the embodiments of the present invention, a source physical machine and a destination physical machine are first determined in a physical machine group according to a first dynamic resource scheduling policy and acquired load information of multiple physical machines under a same access switch, and then a migration instruction is delivered to the source physical machine according to a second dynamic resource scheduling policy, so that the source physical machine migrates a virtual machine on the source physical machine and corresponding to an identifier of a virtual machine to be migrated in the migration instruction to the destination physical machine. This enables network traffic of the migration to pass through the same access switch, which avoids, to some extent, possible migration of a virtual machine in a cluster across multiple switches in the prior art, shortens a length of a data transmission link, increases a migration rate, reduces migration traffic, and further relieves impact of virtual machine live migration in an entire cluster system on network load.

DETAILED DESCRIPTION OF ILLUSTRATIVE EMBODIMENTS

At present, a server virtualization technology is a key technology based on an infrastructure layer in cloud computing. By virtualization of a physical server, deployment of multiple virtual machines (virtual operating systems) on a single physical machine is implemented, which can increase a resource utilization rate of a physical machine and reduce a use cost.

A most important feature of clustered virtual machine management is live migration of a virtual machine. By using real-time live migration, deployment of a large number of virtual machines on physical machines can be adjusted, thereby implementing load balancing, improving a resource utilization rate of each physical machine, and ensuring that each physical machine bears appropriate load.

Figure 1:
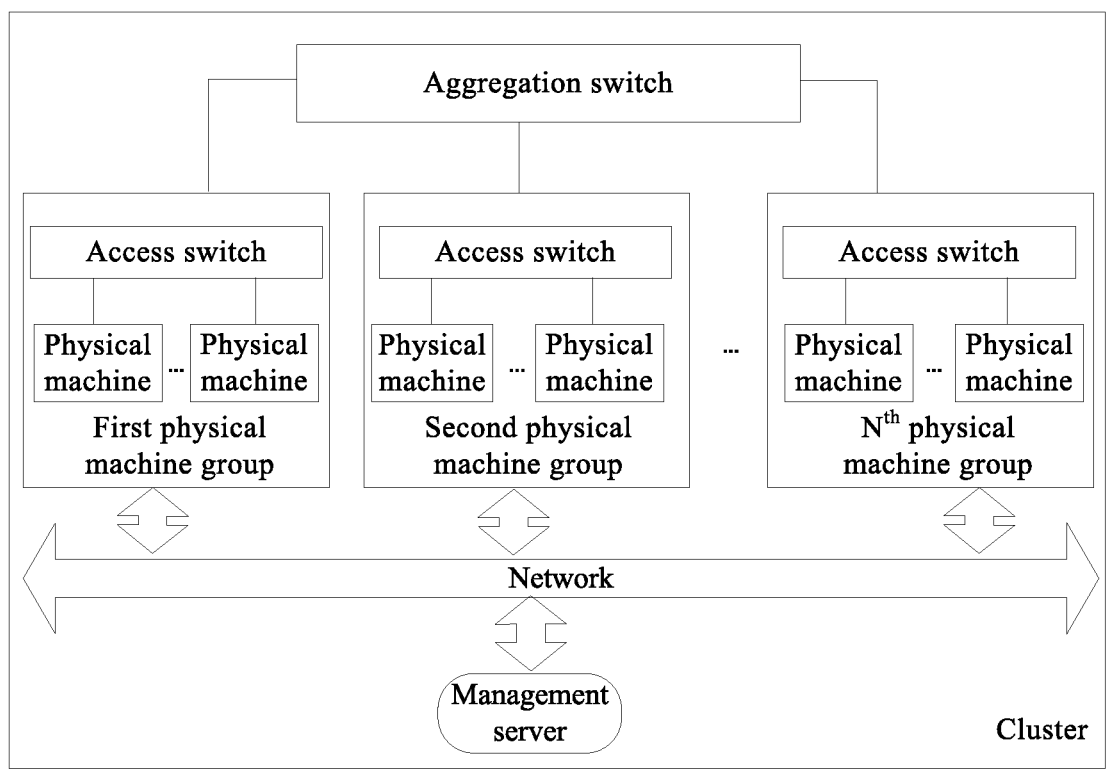
FIG. 1 is a schematic structural diagram of a cluster system applied to embodiments of the present invention.

As shown in FIG. 1, which shows a schematic structural diagram of a cluster system applied to embodiments of the present invention, the cluster shown in FIG. 1 manages multiple physical machines in a unified way, where one or more virtual machines can be provided on each physical machine. Certainly, some physical machines may be deployed with no virtual machine.

In an actual application, a switch (for example, an access switch or an aggregation switch shown in FIG. 1) stores a duplicable image file of a virtual machine. Any physical machine connected to the switch can view and use an image file in the switch.

Usually, a related operator delivers various virtual machine deployment instructions or virtual machine migration instructions to one or more physical machines by using a management server in a cluster system, so that the corresponding physical machine performs virtual machine deployment according to the deployment instructions or performs virtual machine migration according to the migration instructions.

Certainly, to facilitate management of a cluster system, physical machines in a cluster system are divided into multiple physical machine groups (for example, physical machine group 1, physical machine group 2, . . . , and physical machine group N, as shown in FIG. 1). The physical machine groups herein are grouped based on physical machines connected to a same access switch. In other words, all physical machines in each physical machine group share a same access switch and neighboring physical machine groups in a cluster share a same aggregation switch. Live migration of a virtual machine includes migration of a virtual processor and a virtual memory or migration of a virtual storage. Therefore, live migration of a virtual machine refers to migration of computing resources and storage resources of the virtual machine from one physical machine to another physical machine.

In the prior art, a network topology structure of physical machines is not considered in a live migration process in which a related operator delivers a migration instruction so that a physical machine migrates an internal virtual machine to another physical machine according to the migration instruction. As a result, the migration of a virtual machine in a cluster may cross multiple switches, which causes great impact on a network link that is passed through; in addition, an excessively long network link affects a virtual machine migration rate, and causes excessive network load to the cluster.

It should be noted that the management server in this embodiment of the present invention regularly monitors load information of each physical machine and a resource utilization rate of a virtual machine inside the physical machine. In the following embodiments, an executing body of each step is a management server.

Figure 2A:
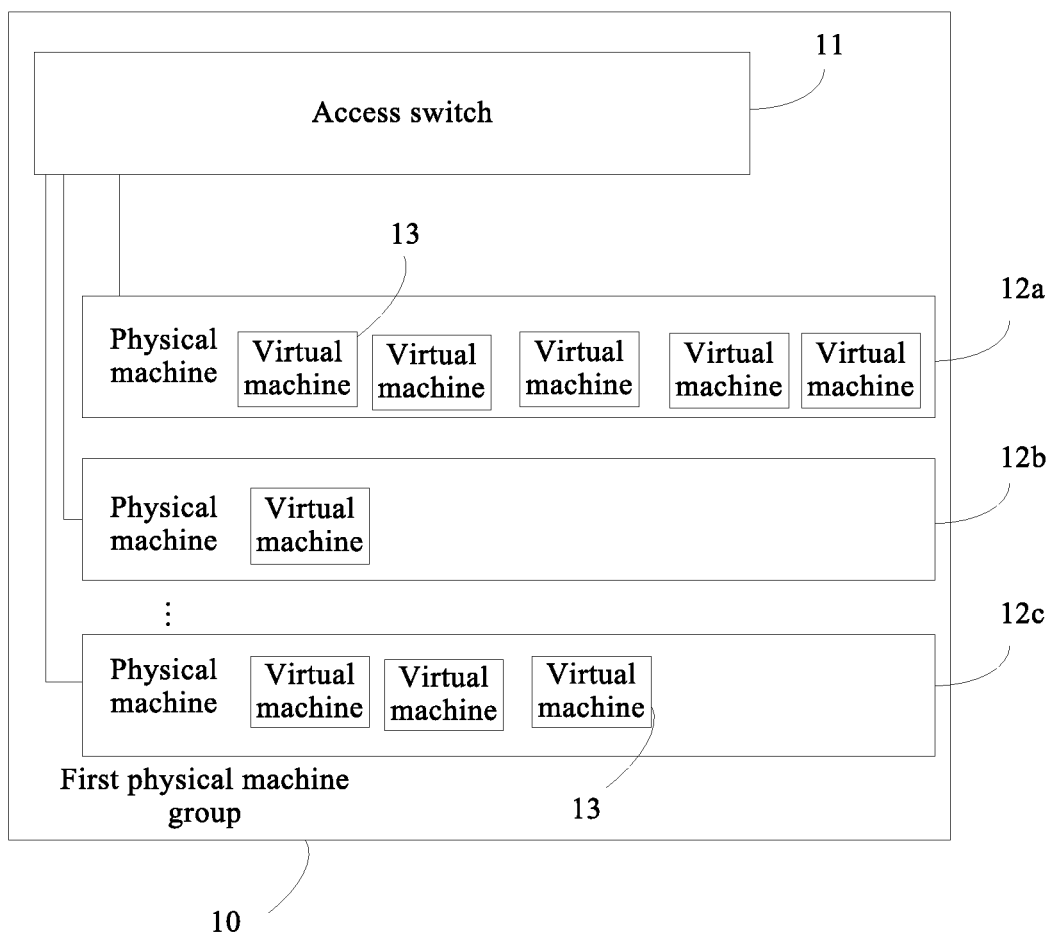
FIG. 2A is a schematic diagram of a physical machine group in a cluster according to an embodiment of the present invention.
Figure 2B:
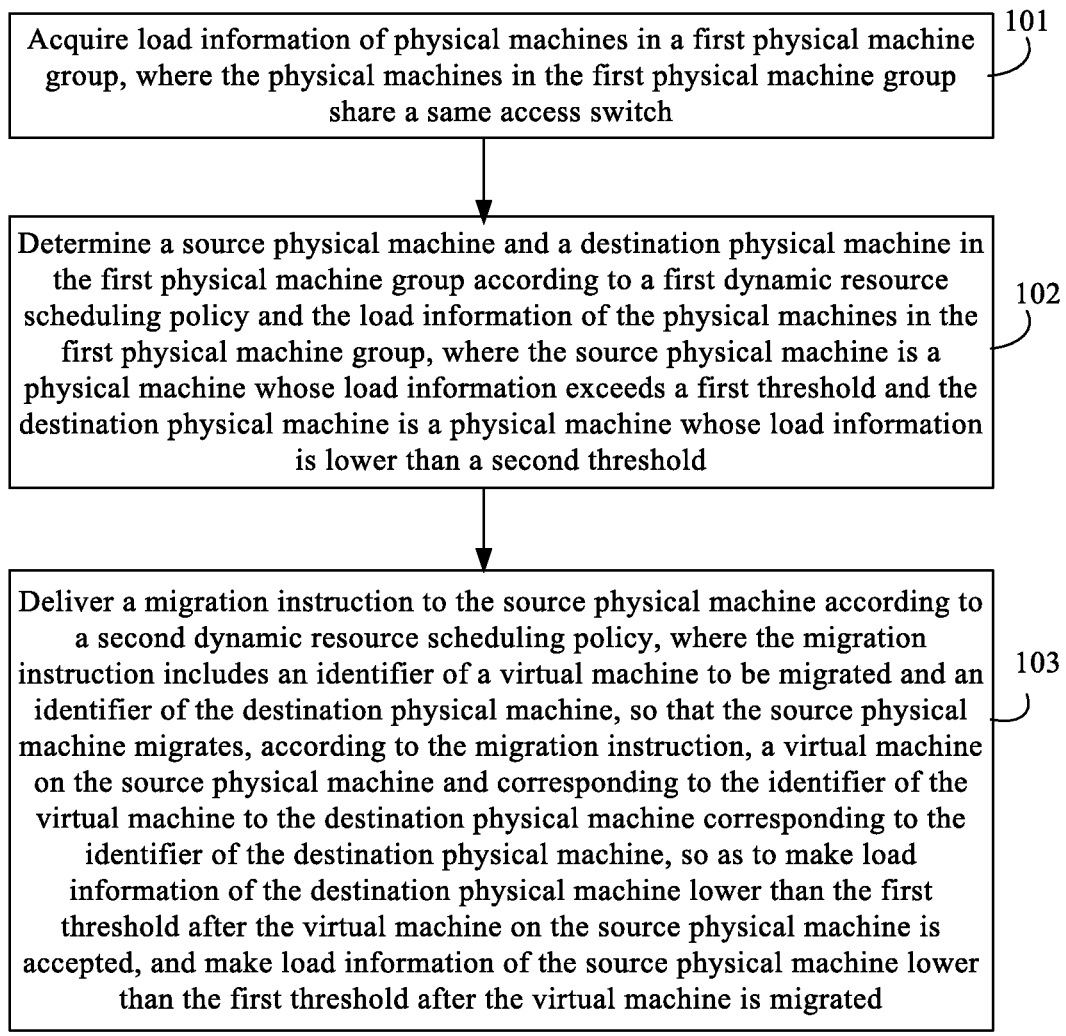
FIG. 2B is a schematic flowchart of a virtual machine live migration method according to an embodiment of the present invention.

FIG. 2A shows a schematic diagram of a physical machine group in a cluster according to an embodiment of the present invention and FIG. 2B shows a schematic flowchart of a virtual machine live migration method according to the embodiment of the present invention. With reference to FIG. 2A and FIG. 2B, the virtual machine live migration method in this embodiment is described as follows. It should be noted that an executing body of the virtual machine live migration method provided by this embodiment of the present invention may be a server, for example, a manager server shown in FIG. 1.

101. Acquire load information of physical machines in a first physical machine group, where the physical machines in the first physical machine group share a same access switch.

It should be noted that the first physical machine group herein refers in general to a same physical group in a cluster system.

In this embodiment, the load information of a physical machine may include a resource utilization rate of a virtual machine and a resource utilization rate of a physical machine, where a resource includes a central processor, a memory, and a storage I/O rate, a network receiving/sending rate, or the like. As shown in FIG. 2A, a first physical machine group 10 includes a physical machine 12a, a physical machine 12b, and a physical machine 12c, which share a same access switch 11.

The first physical machine group 10 shown in FIG. 2A is a universal physical machine group in a cluster and is only an example for description of this embodiment.

102. Determine a source physical machine and a destination physical machine in the first physical machine group according to a first dynamic resource scheduling policy and the load information of the physical machines in the first physical machine group, where the source physical machine is a physical machine whose load information exceeds a first threshold and the destination physical machine is a physical machine whose load information is lower than a second threshold.

In this embodiment, an implementation manner of step 102 can be described by the following.

Conditions for determining a source physical machine and a destination physical machine in the first physical machine group may include a dynamic resource scheduling policy and the load information of the physical machines in the first physical machine group, where the load information includes a resource utilization rate of a physical machine and a resource utilization rate of a virtual machine in the first physical machine group and a resource includes a processor, a memory, and a resource I/O rate, a network receiving/sending rate, or the like. It should be understood that the load information may be collected at a fixed interval and the first resource scheduling policy may specifically include a policy for determining a source physical machine and a policy for determining a destination physical machine, for example, a physical machine whose resource utilization rate is excessively low is referred to as a destination physical machine (for example, a physical machine whose load information is lower than the second threshold may be referred to as a destination physical machine) and a physical machine whose resource utilization rate is excessively high is referred to as a source physical machine (for example, a physical machine whose load information is higher than the first threshold may be referred to as a source physical machine).

Accordingly, the method according to this embodiment of the present invention may further include: calculating a resource distribution status among physical machine groups in the cluster system according to collected load information of physical machines in each physical machine group in the cluster system, so as to obtain, by means of statistics collection, a physical machine with excessively high load information and a physical machine with relatively low load information in each physical machine group, as well as differences of load information between the physical machine groups.

It should be noted that the first threshold is much high than the second threshold. The first threshold and the second threshold may be preset, or be values that are set dynamically by a user through a man-machine interactive interface and are acquired dynamically, that is, the first threshold and the second threshold may be set flexibly according to an actual application situation and are not limited herein.

For example, when the load information is a processor use rate, the first threshold may be 80% and the second threshold may be 30%. Therefore, any physical machine whose processor use rate is higher than 80% in the first physical machine group is a source physical machine.

Any physical machine whose processor use rate is lower than 30% in the first physical machine group is a destination physical machine.

As shown in FIG. 2A, in the first physical machine group 10, a processor use rate of the physical machine 12a is 100%, a processor use rate of the physical machine 12b is 20%, and a processor use rate of the physical machine 12c is 40%.

In the first physical machine group 10, the physical machine 12a is the source physical machine and the physical machine 12b is the destination physical machine.

103. Deliver a migration instruction to the source physical machine according to a second dynamic resource scheduling policy, where the migration instruction includes an identifier of a virtual machine to be migrated and an identifier of the destination physical machine, so that the source physical machine migrates, according to the migration instruction, a virtual machine on the source physical machine and corresponding to the identifier of the virtual machine to be migrated to the destination physical machine corresponding to the identifier of the destination physical machine, so as to make load information of the destination physical machine lower than the first threshold after the virtual machine on the source physical machine is accepted, and make load information of the source physical machine lower than the first threshold after the virtual machine is migrated.

For example, an identifier of a destination physical machine in a migration instruction is a code or number of the physical machine. Generally, each physical machine code can be used to identify content such as a physical machine group in which the physical machine is located and an aggregation switch and an access switch to which the physical machine is connected.

It should also be noted that the second dynamic resource scheduling policy may include a policy for preferentially migrating a virtual machine within a same physical machine group. That is, when a destination physical machine exists in the physical machine group, the migration instruction may be sent to a source physical machine in the same physical machine group according to the second dynamic resource scheduling policy, so that the source physical machine migrates a virtual machine to the destination physical machine in the same physical machine group according to the migration instruction. It is noteworthy that the first dynamic resource scheduling policy and the second dynamic resource scheduling policy may be stored in the same dynamic resource scheduling policy set.

In addition, when the dynamic resource scheduling policy set further includes a policy for ensuring load balancing, the source physical machine may migrate some virtual machines to the destination physical machine, that is, the migration instruction includes identifiers of some virtual machines on the source physical machine, so that load information of physical machines in the same physical machine group is balanced.

Alternatively, when the dynamic resource scheduling policy set further includes an energy saving and emission reduction policy, the source physical machine may migrate all virtual machines to the destination physical machine, that is, the migration instruction includes identifiers of all virtual machines on the source physical machine so as to achieve a purpose of energy saving.

With reference to FIG. 2A, the migration instruction is to migrate two virtual machines 13 on the physical machine 12*a* in the first physical machine group 10 to the physical machine 12*b* in the first physical machine group 10, so as to balance load of physical machines in the first physical machine group 10.

Further, when there are two or more than two destination physical machines in the first physical machine group, it is determined that a physical machine with the lowest load information is a first destination physical machine that accepts a virtual machine on the source physical machine.

Certainly, when there are two or more than two source physical machines in the first physical machine group, the server may send the migration instruction to different source physical machines, so that load information of each destination physical machine that accepts a virtual machine is lower than the first threshold.

Certainly, virtual machines on different sources physical machines may be migrated to a same destination physical machine or virtual machines on different sources physical machines may be migrated to different destination physical machines so that load information of all physical machines in the physical machine group is not higher than the first threshold, so as to achieve load balancing in the physical machine group.

It may be learned from the foregoing embodiment that, in a virtual machine live migration method in this embodiment, a source physical machine and a destination physical machine are first determined in a physical machine group according to a first dynamic resource scheduling policy and acquired load information of multiple physical machines under a same access switch, and then a migration instruction is delivered to the source physical machine according to a second dynamic resource scheduling policy, so that the source physical machine migrates a virtual machine on the source physical machine and corresponding to a virtual machine identifier in the migration instruction to the destination physical machine, so as to make network traffic of the migration pass through a same access switch. This avoids, to some extent, possible migration of a virtual machine in a cluster across multiple switches in the prior art, thereby shortening a length of a data transmission link, increasing a migration rate, reducing migration traffic, and further relieving impact of virtual machine live migration in an entire cluster system on network load.

Figure 3A:
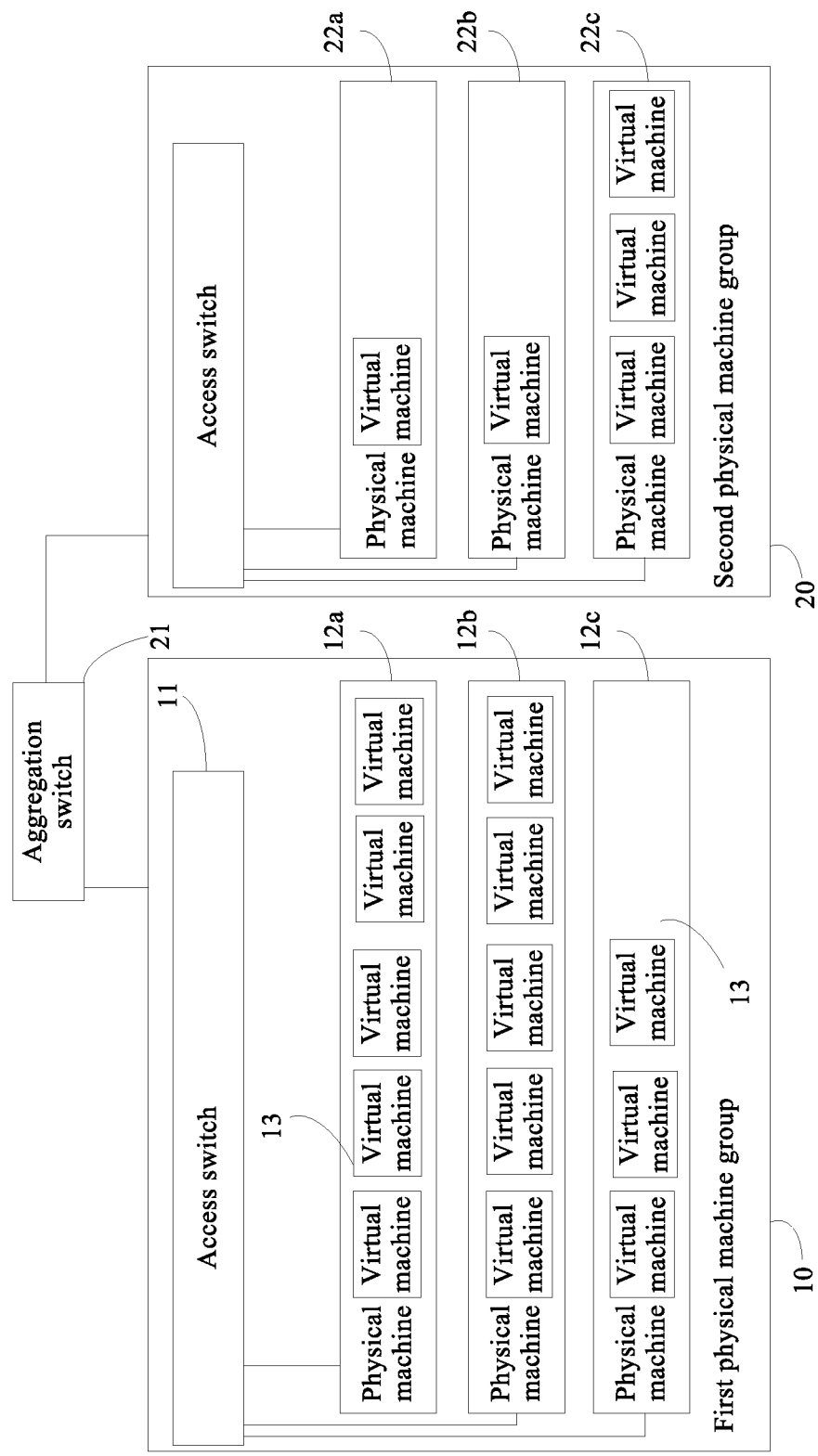
FIG. 3A is a partial schematic structural diagram of a cluster system according to an embodiment of the present invention.
Figure 3B:
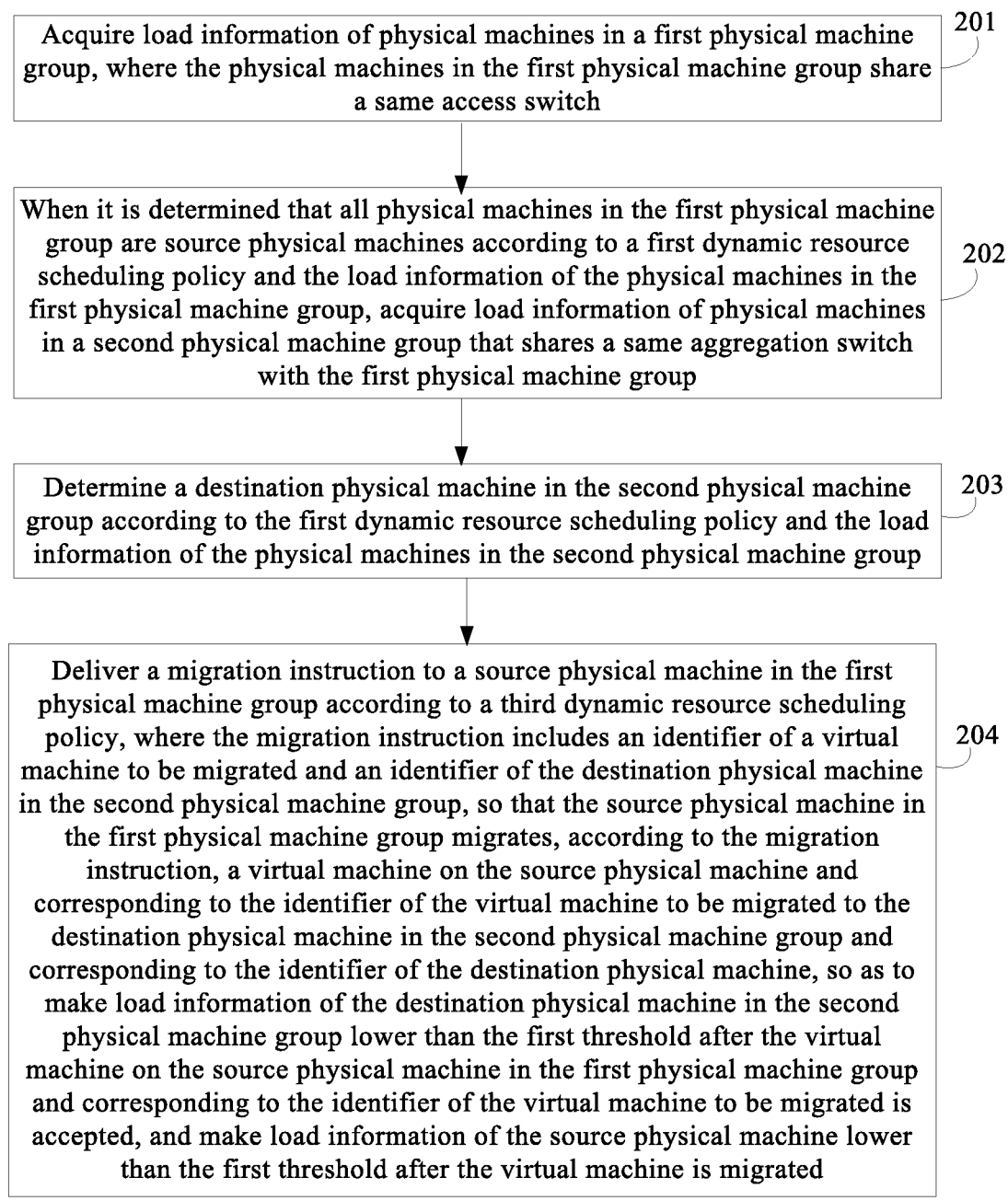
FIG. 3B is a schematic flowchart of a virtual machine live migration method according to an embodiment of the present invention.

FIG. 3A shows a partial schematic structural diagram of a cluster system according to an embodiment of the present invention and FIG. 3B shows a schematic flowchart of a virtual machine live migration method according to the embodiment of the present invention. With reference to FIG. 3A and FIG. 3B, the virtual machine live migration method in this embodiment is described as follows:

201. Acquire load information of physical machines in a first physical machine group, where the physical machines in the first physical machine group share a same access switch.

As shown in FIG. 3A, a first physical machine group 10 includes a physical machine 12*a*, a physical machine 12*b*, and a physical machine 12*c*, which share a same access switch 11.

202. When it is determined that all physical machines in the first physical machine group are source physical machines according to a first dynamic resource scheduling policy and the load information of the physical machines in the first physical machine group, acquire load information of physical machines in a second physical machine group that shares a same aggregation switch with the first physical machine group.

As shown in FIG. 3A, a second physical machine group 20 shares a same aggregation switch 21 with the first physical machine group 10, and the second physical machine group 20 includes a physical machine 22*a*, a physical machine 22*b*, and a physical machine 22*c*, which share a same access switch.

For example, when the load information is a processor use rate, a first threshold is 80% and a second threshold is 30%.

For any virtual machine shown in this diagram, with respect to a physical machine, a processor use rate of the physical machine is 20%. A processor use rate of any physical machine (physical machine 12*a*, physical machine 12*b*, or physical machine 12*c*) in the first physical machine group 10 is higher than 80%, and the physical machines in the first physical machine group are all source physical machines.

Processor use rates of the physical machine 22*a* and physical machine 22*b* in the second physical machine group 20 are both lower than 30%.

203. Determine a destination physical machine in the second physical machine group according to the first dynamic resource scheduling policy and the load information of the physical machines in the second physical machine group.

The physical machine 22*a* and physical machine 22*b* in the second physical machine group 20 are destination physical machines.

204. Deliver a migration instruction to the source physical machines in the first physical machine group according to a third dynamic resource scheduling policy, where the migration instruction includes an identifier of a virtual machine to be migrated and an identifier of the destination physical machine in the second physical machine group, so that the source physical machine in the first physical machine group migrates, according to the migration instruction, a virtual machine on the source physical machine and corresponding to the identifier of the virtual machine to be migrated to the destination physical machine in the second physical machine group and corresponding to the identifier of the destination physical machine, so as to make load information of the destination physical machine in the second physical machine group lower than the first threshold after the virtual machine on the source physical machine in the first physical machine group and corresponding to the identifier of the virtual machine to be migrated is accepted, and make load information of the source physical machine lower than the first threshold after the virtual machine is migrated.

In this embodiment, the third dynamic resource scheduling policy may include a policy for preferentially migrating, if virtual machine migration cannot be performed within a same physical machine group, a virtual machine to a destination physical machine of a physical machine group that shares another switch and is under a same aggregation switch. That is, when no destination physical machine exists in the first physical machine group, the migration instruction may be sent to the source physical machine in the first physical machine group according to the third dynamic resource scheduling policy, so as to trigger the source physical machine to migrate, according to the migration instruction, a virtual machine to a destination physical machine in a physical machine group that shares another switch and is under a same aggregation switch. It is noteworthy that the first dynamic resource scheduling policy, second dynamic resource scheduling policy, and third dynamic resource scheduling policy may be stored in a same dynamic resource scheduling policy set.

With reference to FIG. 3A, the migration instruction is to migrate two virtual machines 13 on the physical machine 12*a* in the first physical machine group to the physical machine 22*a* in the second physical machine group 20; and/or the migration instruction is to migrate two virtual machines 13 on the physical machine 12*b* in the first physical machine group to the physical machine 22*b* in the second physical machine group 20. That is, a server in the cluster system may deliver a first migration instruction to the physical machine 12*a* and meanwhile may also deliver a second migration instruction to the physical machine 12*b*. In the first migration instruction and the second migration instruction, source physical machines are different, but destination physical machines may be the same or different, which are configured according to actual load information of the physical machines in the second physical machine group.

It can be learned from FIG. 3A that, when two virtual machines 13 on the physical machine 12*a* and two virtual machines 13 on the physical machine 12*b* in the first physical machine group are migrated to the physical machine 22*a* in the second physical machine group 20, a result is that load information of the physical machine 22*a* in the second physical machine group 20 is not lower than the first threshold 80%. Therefore, the physical machine 22*a* in the second physical machine group 20 may accept only two virtual machines so as to ensure that the load information of the physical machine 22*a* in the second physical machine group 20 is lower than the first threshold.

Certainly, in an actual application, when there are two or more than two destination physical machines in the second physical machine group, it is determined that a physical machine with the lowest load information in the second physical machine group is a first destination physical machine that accepts a virtual machine on a source physical machine in the first physical machine group.

It may be learned from the foregoing embodiment that, in a virtual machine live migration method in this embodiment, after it is determined that all physical machines in a physical machine group are source physical machines according to a dynamic resource scheduling policy and acquired load information of multiple physical machines under a same access switch, load information of physical machines in a second physical machine group that shares a same aggregation switch with the first physical machine group is acquired, and then a server delivers a migration instruction to a source physical machine so that the source physical machine migrates, according to the migration instruction, a virtual machine on the source physical machine and corresponding to an identifier of a virtual machine to be migrated in the migration instruction to a destination physical machine in the second physical machine group, so as to make network traffic of the migration pass through only two access switches and one aggregation switch. This shortens a length of a data transmission link, increases a migration rate, reduces migration traffic, and further relieves impact of virtual machine live migration in an entire cluster system on network load.

It may be learned from the foregoing embodiment that load information of physical machines is adjusted preferentially within one physical machine group, and, if load information of all physical machines in a physical machine group reaches a first threshold, load of physical machines may be adjusted among physical machine groups that share an aggregation switch. This can effectively reduce network load in a virtual machine migration process and also increase a migration rate.

Figure 4A:
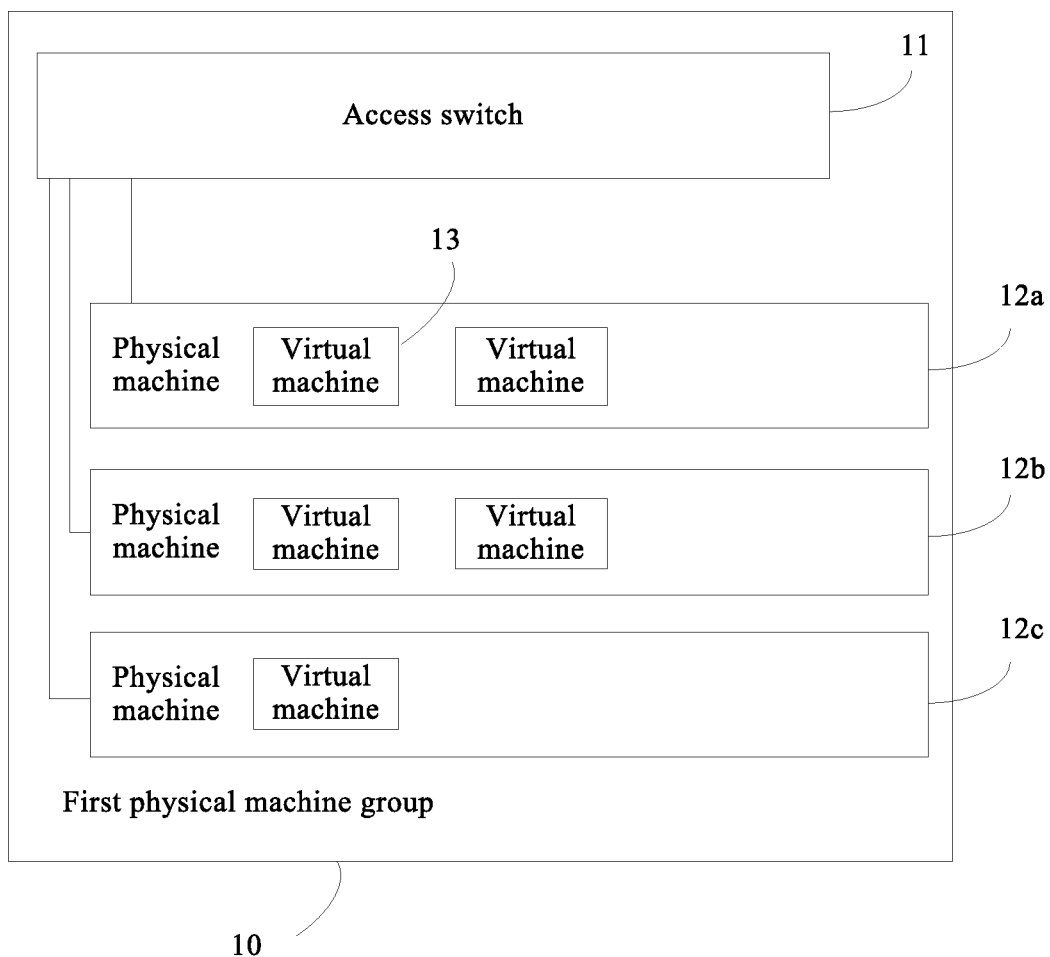
FIG. 4A is a schematic diagram of a physical machine group in a cluster according to an embodiment of the present invention.
Figure 4B:
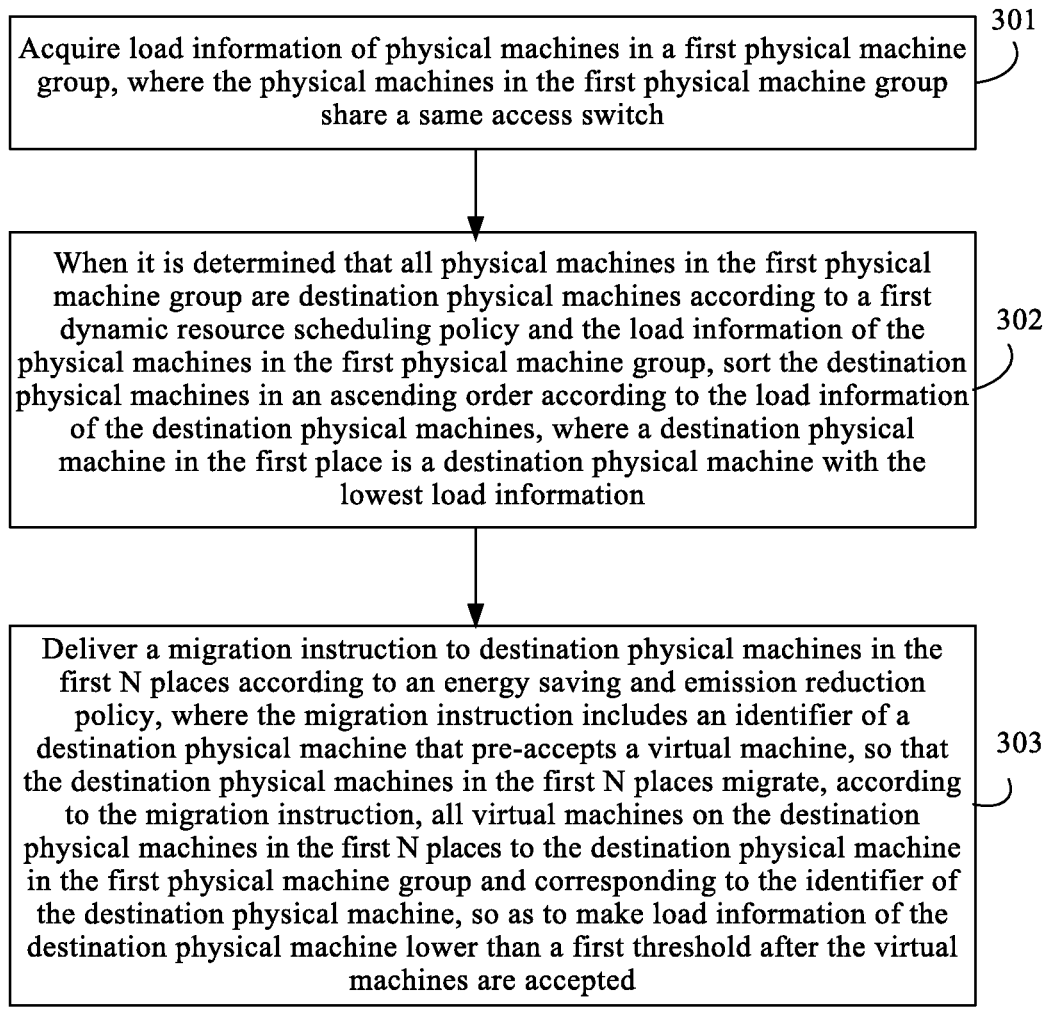
FIG. 4B is a schematic flowchart of a virtual machine live migration method according to an embodiment of the present invention.

FIG. 4A shows a schematic diagram of a physical machine group according to an embodiment of the present invention and FIG. 4B shows a schematic flowchart of a virtual machine live migration method according to the embodiment of the present invention. With reference to FIG. 4A and FIG. 4B, the virtual machine live migration method in this embodiment is described as follows:

301. Acquire load information of physical machines in a first physical machine group, where the physical machines in the first physical machine group share a same access switch.

As shown in FIG. 4A, a first physical machine group 10 includes a physical machine 12*a*, a physical machine 12*b*, and a physical machine 12*c*, which share a same access switch 11.

For example, the load information of a physical machine may include a resource utilization rate of a virtual machine and a resource utilization rate of a physical machine, where a resource includes a central processor, a memory, and a storage I/O rate, a network receiving/sending rate, or the like.

302. When it is determined that all physical machines in the first physical machine group are destination physical machines according to a first dynamic resource scheduling policy and the load information of the physical machines in the first physical machine group, sort the destination physical machines in an ascending order according to the load information of the destination physical machines, where a destination physical machine in the first place is a destination physical machine with the lowest load information.

For example, when the load information is a processor use rate, a first threshold is 80% and a second threshold is 50%.

As shown in FIG. 4A, there are 5 virtual machines in total on each physical machine in the first physical machine group 10, and a processor use rate of any physical machine (physical machine 12a, physical machine 12b, or physical machine 12c) in the first physical machine group 10 is lower than 50%, where the physical machines in the first physical machine group are all destination physical machines. For any virtual machine shown in this diagram, with respect to a physical machine on which the virtual machine is located, a processor use rate of the physical machine is 20%.

303. Deliver a migration instruction to destination physical machines in the first N places according to an energy saving and emission reduction policy, where the migration instruction includes an identifier of a destination physical machine that pre-accepts a virtual machine, so that the destination physical machines in the first N places migrate, according to the migration instruction, all virtual machines on the destination physical machines in the first N places to the destination physical machine in the first physical machine group and corresponding to the identifier of the destination physical machine, so as to make load information of the destination physical machine lower than a first threshold after the virtual machines are accepted.

In this embodiment, N is an integer greater than or equal to 1, and N is smaller than the total number of destination physical machines in the first physical machine group.

Certainly, in another embodiment, step 302 may also be as follows: When it is determined that all physical machines in the first physical machine group are destination physical machines according to the first dynamic resource scheduling policy and the load information of the physical machines in the first physical machine group, sort the destination physical machines in a descending order according to the load information of the destination physical machines, where a destination physical machine in the last place is a destination physical machine with the lowest load information.

Accordingly, step 303 is as follows: Deliver a migration instruction to destination physical machines in the last N places according to an energy saving and emission reduction policy, where the migration instruction includes an identifier of a destination physical machine that pre-accepts a virtual machine, so that the destination physical machines in the last N places migrate, according to the migration instruction, all virtual machines on the destination physical machines to the destination physical machine in the first physical machine group and corresponding to the identifier of the destination physical machine, so as to make load information of the destination physical machine lower than a first threshold after the virtual machines are accepted.

As shown in FIG. 4A, the migration instruction is to migrate all virtual machines on a destination physical machine in the first place, namely the physical machine 12c, to the physical machine 12a or physical machine 12b in the first physical machine group 10.

When a physical machine that has very low load information exists in a cluster system, it may be considered that virtual machines on the physical machine having very low load information are all migrated and then the idle physical machine be powered off, so as to achieve a purpose of energy saving. When overall load of the cluster rises, accordingly, a physical machine is power-on and a new virtual machine is deployed on the physical machine.

It may be learned from the foregoing embodiment that, in a virtual machine live migration method in this embodiment, description focuses on that, when all physical machines in a physical machine group are destination physical machines (namely physical machines with relatively low load information), a physical machine 12c in a first physical machine group may be integrated and powered off (for example, virtual machines on the physical machine 12c are migrated to another physical machine in the same physical machine group so that the physical machine 12c becomes idle and then is powered off). This can effectively utilize resources in a cluster, properly deploy a virtual machine, save costs of a cluster management system, and achieve an effect of energy saving and emission reduction.

Figure 5A:
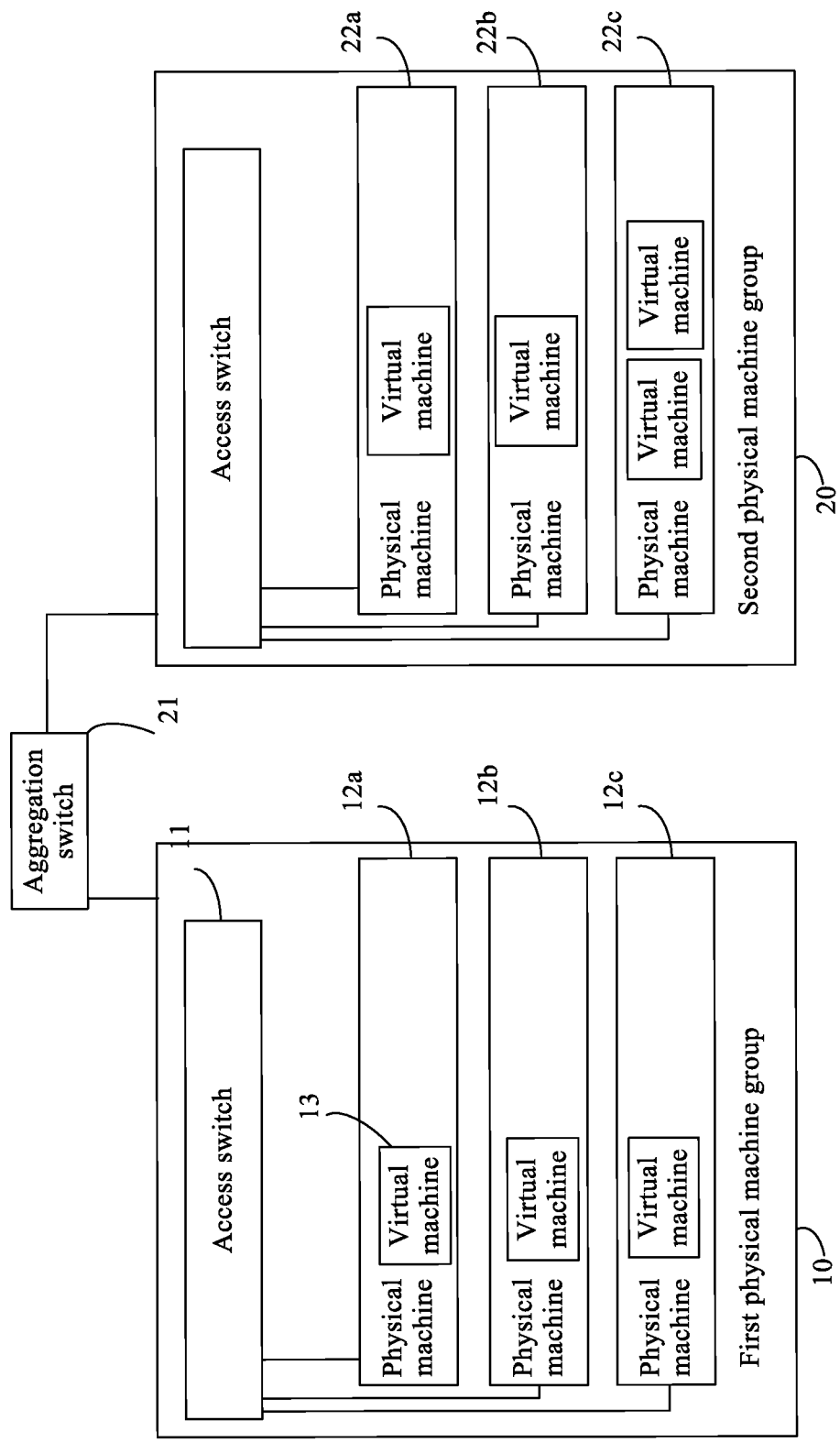
FIG. 5A is a partial schematic structural diagram of a cluster system according to an embodiment of the present invention.
Figure 5B:
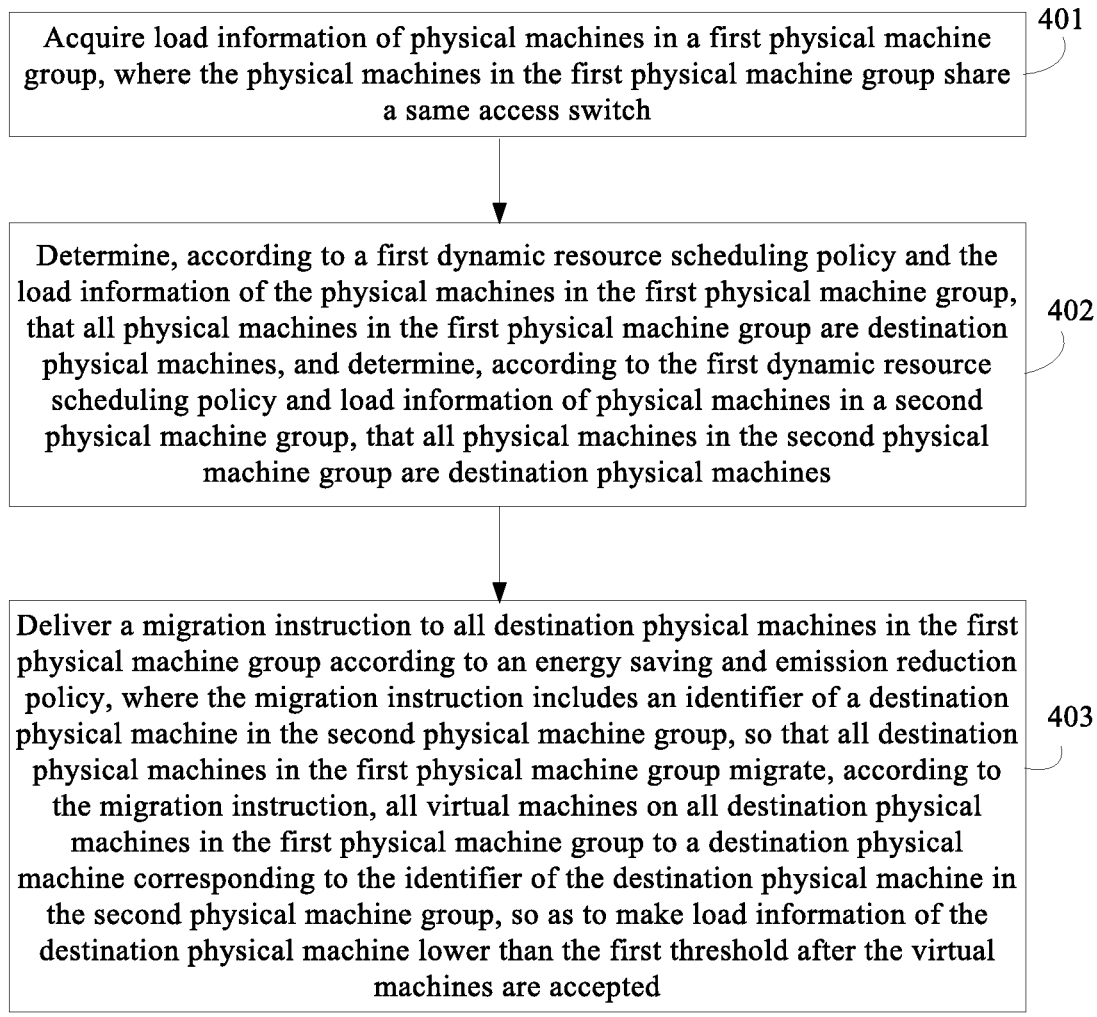
FIG. 5B is a schematic flowchart of a virtual machine live migration method according to an embodiment of the present invention.

FIG. 5A shows a partial schematic structural diagram of a cluster system according to an embodiment of the present invention and FIG. 5B shows a schematic flowchart of a virtual machine live migration method according to the embodiment of the present invention. With reference to FIG. 5A and FIG. 5B, the virtual machine live migration method in this embodiment is described as follows:

401. Acquire load information of physical machines in a first physical machine group, where the physical machines in the first physical machine group share a same access switch.

As shown in FIG. 5A, a first physical machine group 10 includes a physical machine 12a, a physical machine 12b, and a physical machine 12c, which share a same access switch 11.

For example, the load information of a physical machine may include a resource utilization rate of a virtual machine and a resource utilization rate of a physical machine, where a resource includes a central processor, a memory, and a storage I/O rate, a network receiving/sending rate, or the like.

402. Determine, according to a first dynamic resource scheduling policy and the load information of the physical machines in the first physical machine group, that all physical machines in the first physical machine group are destination physical machines, and determine, according to the first dynamic resource scheduling policy and load information of physical machines in a second physical machine group, that all physical machines in the second physical machine group are destination physical machines.

For example, when the load information is a memory occupation rate, a first threshold is 80% and a second threshold is 50%.

As shown in FIG. 5A, there are 5 virtual machines in total on each physical machine in the first physical machine group 10, and a memory occupation rate of any physical machine (physical machine 12a, physical machine 12b, or physical machine 12c) in the first physical machine group 10 is lower than 50%, where the physical machines in the first physical machine group are all destination physical machines.

There are 5 virtual machines in total on each physical machine in the second physical machine group 20, and a memory occupation rate of any physical machine (physical machine 22a, physical machine 22b, or physical machine 22c) in the second physical machine group 20 is lower than 50%, where all physical machines in the second physical machine group are destination physical machines. For any virtual machine shown in this diagram, with respect to a physical machine on which the virtual machine is located, a memory occupation rate of the physical machine is 20%.

403. Deliver a migration instruction to all destination physical machines in the first physical machine group according to an energy saving and emission reduction policy, where the migration instruction includes an identifier of a destination physical machine in the second physical machine group, so that all destination physical machines in the first physical machine group migrate, according to the migration instruction, all virtual machines on all destination physical machines in the first physical machine group to a destination physical machine in the second physical machine group and corresponding to the identifier of the destination physical machine, so as to make load information of the destination physical machine lower than the first threshold after the virtual machines are accepted.

Certainly, in another embodiment, step 403 may also be as follows: Deliver a migration instruction to all destination physical machines in the second physical machine group according to an energy saving and emission reduction policy, where the migration instruction includes an identifier of a destination physical machine in the first physical machine group, so that all destination physical machines in the second physical machine group migrate, according to the migration instruction, all virtual machines on all destination physical machines in the second physical machine group to a destination physical machine in the first physical machine group and corresponding to the identifier of the destination physical machine, so as to make load information of the destination physical machine lower than the first threshold after the virtual machines are accepted.

For example, as shown in FIG. 5A, a migration instruction accepted by the physical machine 12a is to migrate virtual machines on the physical machine 12a in the first physical machine group 10 to the physical machine 22a in the second physical machine group 20.

A migration instruction received by the physical machine 12b is to migrate virtual machines on the physical machine 12b in the first physical machine group 10 to the physical machine 22b in the second physical machine group 20.

A migration instruction received by the physical machine 12c is to migrate virtual machines on the physical machine 12c in the first physical machine group 10 to the physical machine 22c in the second physical machine group 20.

It should be noted that, in any one of the foregoing migration instructions, physical machines that are to accept virtual machines and in the second physical machine group may be any one or more physical machines. This embodiment is merely an exemplary description. The physical machines are configured according to actual load information.

For example, virtual machines on each physical machine in the first physical machine group may be migrated to the physical machine 22a, physical machine 22b, or physical machine 22c in the second physical machine group 20.

Certainly, in another embodiment, the migration instruction may also instruct to migrate virtual machines on each physical machine in the second physical machine group 20 to the physical machine 12a, physical machine 12b, or physical machine 12c in the first physical machine group 10.

It should be noted that, to migrate virtual machines on each physical machine in the first physical machine group 10 to a corresponding physical machine in the second physical machine group 20, three virtual machines need to be migrated and network traffic of the migration needs to pass through two access switches and one aggregation switch.

However, to migrate virtual machines on each physical machine in the second physical machine group 20 to a corresponding physical machine in the first physical machine group 10, four virtual machines need to be migrated and network traffic of the migration needs to pass through two access switches and one aggregation switch.

Therefore, migration of virtual machines on each physical machine in the first physical machine group 10 to a corresponding physical machine in the second physical machine group 20 can better save network traffic during a migration process, so as to reduce network load in the cluster, and achieve a purpose of energy saving and emission reduction.

It may be learned from the foregoing embodiment that, load information of a physical machine is adjusted preferentially within a physical machine group, and, when load information of no physical machine in multiple physical machine groups that share an aggregation switch reaches a second threshold, load of physical machines may be adjusted among the physical machine groups that share the aggregation switch. This can effectively reduce network load in a virtual machine migration process, reduce costs of a cluster management system, and achieve a purpose of energy saving and emission reduction.

It may be learned from the foregoing embodiment that a server may perform adjustment preferentially within one physical machine group. Adjustment among physical machine groups is considered only when a resource adjustment objective cannot be achieved within one physical machine group. This ensures that virtual machine live migration is performed preferentially under a same access switch, which relieves impact on an entire cluster network, and increases a migration rate, that is, increases a rate of resource scheduling.

Figure 6A:
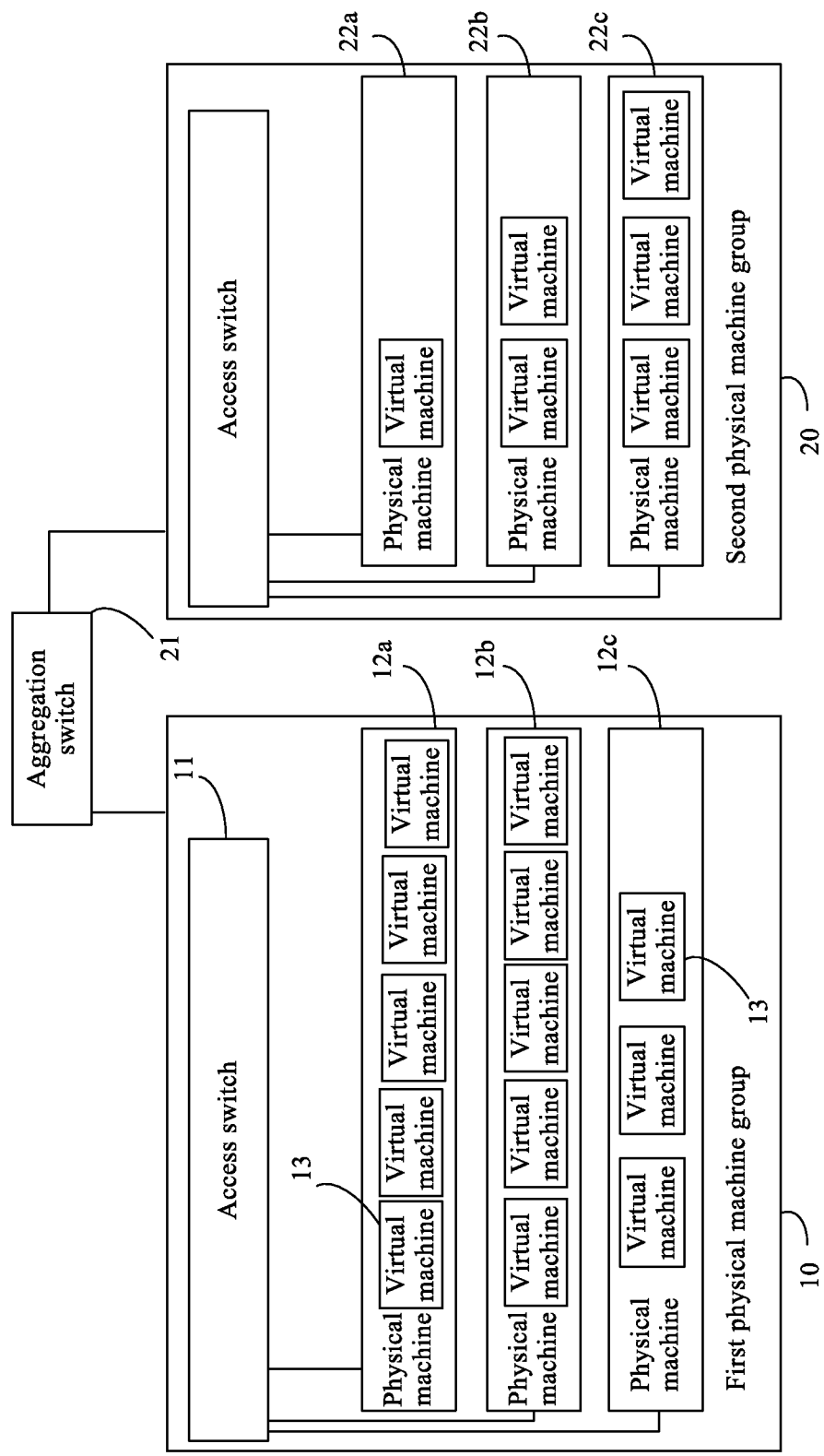
FIG. 6A is a partial schematic structural diagram of a cluster system according to an embodiment of the present invention.
Figure 6B:
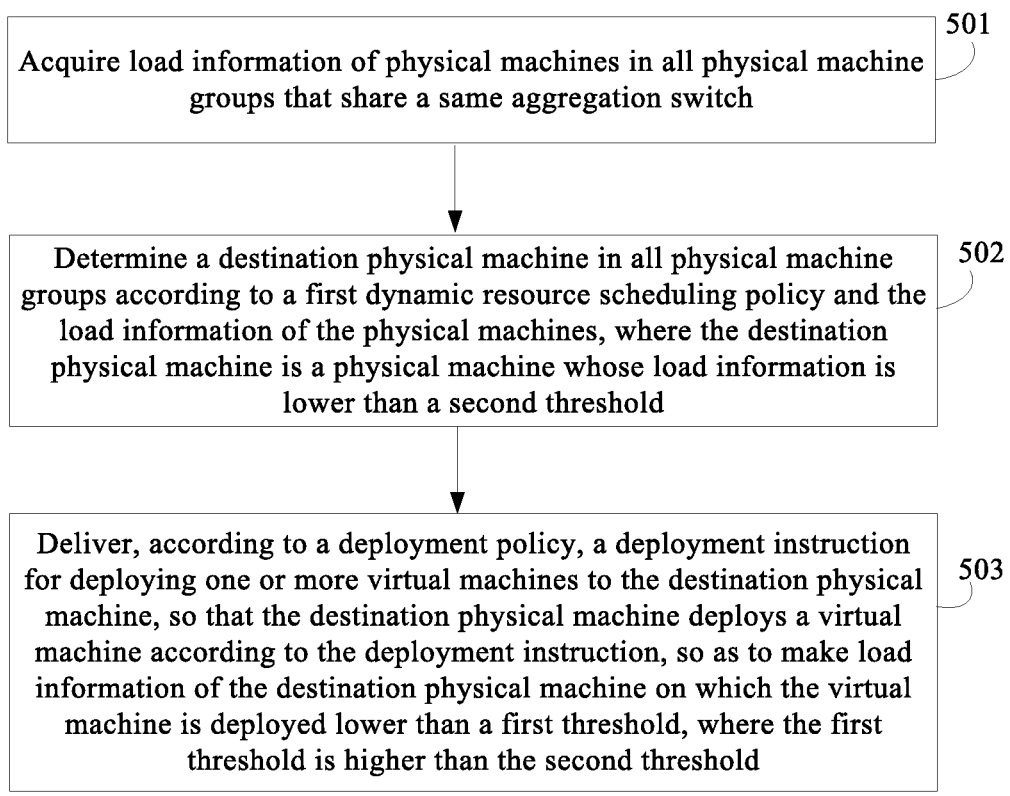
FIG. 6B is a schematic flowchart of a virtual machine deployment method according to an embodiment of the present invention.

FIG. 6A shows a partial schematic structural diagram of a cluster system according to an embodiment of the present invention and FIG. 6B shows a schematic flowchart of a virtual machine deployment method according to the embodiment of the present invention. With reference to FIG. 6A and FIG. 6B, the virtual machine deployment method in this embodiment is described as follows.

501. Acquire load information of physical machines in all physical machine groups that share a same aggregation switch.

For example, the load information of a physical machine may include a resource utilization rate of a virtual machine and a resource utilization rate of a physical machine, where a resource includes a central processor, a memory, and a storage I/O rate, a network receiving/sending rate, or the like.

As shown in FIG. 6A, a first physical machine group 10 includes a physical machine 12a, a physical machine 12b, and a physical machine 12c, which share a same access switch 11.

A second physical machine group 20 includes a physical machine 22a, a physical machine 22b, and a physical machine 22c; and the first physical machine group 10 and the second physical machine group 20 share a same aggregation switch 21. For any virtual machine shown in this diagram, with respect to a physical machine on which the virtual machine is located, a processor use rate of the physical machine is 20%.

It may be learned from FIG. 6A that the physical machine 22a in the second physical machine group has the lowest load information.

502. Determine a destination physical machine in all physical machine groups according to a first dynamic resource scheduling policy and the load information of the physical machines, where the destination physical machine is a physical machine whose load information is lower than a second threshold.

In this embodiment, the first dynamic resource scheduling policy may specifically include a policy for determining a destination physical machine.

503. Deliver, according to a deployment policy, a deployment instruction for deploying one or more virtual machines to the destination physical machine, so that the destination physical machine deploys a virtual machine according to the deployment instruction, so as to make load information of the destination physical machine on which the virtual machine is deployed lower than a first threshold, where the first threshold is higher than the second threshold.

The deployment policy is used to balance load information of physical machine groups and balance load information of physical machines in each physical machine group.

In an actual application, when there are two or more than two destination physical machines, the deployment instruction is delivered to a physical machine with the lowest load information.

It may be learned from the foregoing embodiment that, in the virtual machine deployment method in this embodiment, deployment is performed according to load information of physical machines. In this way, virtual machines can be properly deployed on physical machines under a same aggregation switch, load information of physical machine groups can be balanced, and load information of physical machines in each physical machine group can be balanced, so as to effectively reduce the times of subsequent virtual machine migration.

Figure 7:
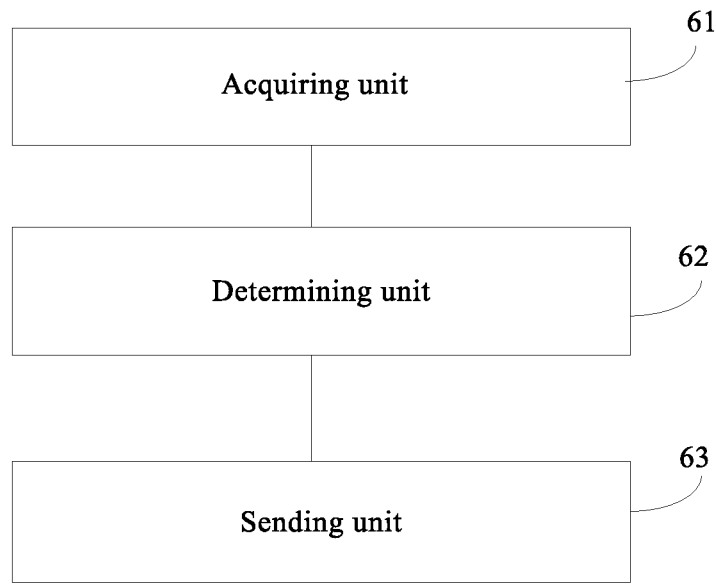
FIG. 7 is a schematic structural diagram of a server according to another embodiment of the present invention.

According to another aspect of the present invention, FIG. 7 shows a schematic structural diagram of a server according to another embodiment of the present invention. The server in this embodiment includes an acquiring unit 61, a determining unit 62, and a sending unit 63.

The acquiring unit 61 is configured to acquire load information of physical machines in a first physical machine group, where the physical machines in the first physical machine group share a same access switch.

The determining unit 62 is configured to determine a source physical machine and a destination physical machine in the first physical machine group according to a first dynamic resource scheduling policy and the load information of the physical machines in the first physical machine group, where the source physical machine is a physical machine whose load information exceeds a first threshold, and the destination physical machine is a physical machine whose load information is lower than a second threshold, where the first threshold is higher than the second threshold.

The sending unit 63 is configured to deliver a migration instruction to the source physical machine according to a second dynamic resource scheduling policy, where the migration instruction includes an identifier of a virtual machine to be migrated and an identifier of the destination physical machine, so that the source physical machine migrates, according to the migration instruction, a virtual machine on the source physical machine and corresponding to the identifier of the virtual machine to be migrated to the destination physical machine corresponding to the identifier of the destination physical machine, so as to make load information of the destination physical machine lower than the first threshold after the virtual machine on the source physical machine and corresponding to the identifier of the virtual machine to be migrated is accepted, and make load information of the source physical machine lower than the first threshold after the virtual machine is migrated.

For example, the foregoing load information may include a resource utilization rate of a virtual machine and a resource utilization rate of a physical machine, where the a resource includes a central processor, a memory, and a storage I/O rate, a network receiving/sending rate, or the like.

Further, when the determining unit 61 determines, according to the load information of the physical machines in the first physical machine group, that all physical machines in the first physical machine group are source physical machines. The acquiring unit 61 is further configured to acquire load information of physical machines in a second physical machine group that shares a same aggregation switch with the first physical machine group. Accordingly, the determining unit 62 is further configured to determine a destination physical machine in the second physical machine group according to the first dynamic resource scheduling policy and the load information of the physical machines in the second physical machine group.

The sending unit 63 is further configured to deliver the migration instruction to the source physical machines in the first physical machine group according to a third dynamic resource scheduling policy, where the migration instruction includes an identifier of a virtual machine to be migrated and an identifier of the destination physical machine in the second physical machine group, so that the source physical machine in the first physical machine group migrates, according to the migration instruction, a virtual machine on the source physical machine and corresponding to the identifier of the virtual machine to be migrated to the destination physical machine in the second physical machine group and corresponding to the identifier of the destination physical machine, so as to make load information of the destination physical machine in the second physical machine group lower than the first threshold after the virtual machine on the source physical machines in the first physical machine group and corresponding to the identifier of the virtual machines to be migrated is accepted, and make load information of the source physical machine lower than the first threshold after the virtual machine is migrated.

Optionally, the sending unit 63 is further configured to, when it is determined that there are two or more than two destination physical machines in the first physical machine group, select a physical machine with the lowest load information as a first destination physical machine that accepts a virtual machine on the source physical machine.

In an actual application, the sending unit 63 is further configured to, when it is determined that there are two or more than two destination physical machines in the second physical machine group, select a physical machine with the lowest load information in the second physical machine group as a first destination physical machine that accepts a virtual machine on the source physical machine in the first physical machine group.

Further, the server further includes a sorting unit that is not shown in the diagram. The sorting unit is configured to, when the determining unit 62 determines that all physical machines in the first physical machine group are destination physical machines according to the first dynamic resource scheduling policy and the load information of the physical machines in the first physical machine group, sort the destination physical machines in an ascending order according to the load information of the destination physical machines, where a destination physical machine in the first place is a destination physical machine with the lowest load information; or sort the destination physical machines in a descending order according to the load information of the destination physical machines, where a destination physical machine in the last place is a destination physical machine with the lowest load information; and accordingly, the sending unit 63 is further configured to: deliver, according to an energy saving and emission reduction policy, the migration instruction to destination physical machines in the first N places in the ascending-order sorting, where the migration instruction includes an identifier of a destination physical machine that pre-accepts a virtual machine, so that the destination physical machines in the first N places migrate, according to the migration instruction, all virtual machines on the destination physical machines in the first N places to a destination physical machine in the first physical machine group and corresponding to the identifier of the destination physical machine, so as to make load information of the destination physical machine lower than the first threshold after the virtual machines are accepted; or deliver, according to an energy saving and emission reduction policy, the migration instruction to destination physical machines in the last N places in the descending-order sorting, where the migration instruction includes an identifier of a destination physical machine that pre-accepts a virtual machine, so that the destination physical machines in the last N places migrate, according to the migration instruction, all virtual machines on the destination physical machines in the last N places to a destination physical machine in the first physical machine group and corresponding to the identifier of the destination physical machine, so as to make load information of the destination physical machine lower than the first threshold after the virtual machines are accepted. N is an integer greater than or equal to 1, and N is smaller than the total number of destination physical machines in the first physical machine group.

Further, when the determining unit 62 determines that all physical machines in the first physical machine group are destination physical machines according to the first dynamic resource scheduling policy and the load information of the physical machines in the first physical machine group and that all physical machines in the second physical machine group are destination physical machines according to the first dynamic resource scheduling policy and the load information of the physical machines in the second physical machine group. The sending unit 63 is further configured to deliver the migration instruction to all destination physical machines in the first physical machine group according to an energy saving and emission reduction policy, where the migration instruction includes an identifier of a destination physical machine in the second physical machine group, so that all destination physical machines in the first physical machine group migrate, according to the migration instruction, all virtual machines on all destination physical machines in the first physical machine group to a destination physical machine in the second physical machine group and corresponding to the identifier of the destination physical machine, so as to make load information of the destination physical machine lower than the first threshold after the virtual machines are accepted; or deliver the migration instruction to all destination physical machines in the second physical machine group according to an energy saving and emission reduction policy, where the migration instruction includes an identifier of a destination physical machine in the first physical machine group, so that all destination physical machines in the second physical machine group migrate, according to the migration instruction, all virtual machines on all destination physical machines in the second physical machine group to a destination physical machine in the first physical machine group and corresponding to the identifier of the destination physical machine, so as to make load information of the destination physical machine lower than the first threshold after the virtual machines are accepted.

It may be learned from the foregoing embodiment that, by using a server in this embodiment, a determining unit determines a source physical machine and a destination physical machine in a physical machine group according to a first dynamic resource scheduling policy and load information, acquired by an acquiring unit, of multiple physical machines under a same access switch, and then migrates a virtual machine on the source physical machine and corresponding to an identifier of a virtual machine to be migrated in a migration instruction to the destination physical machine, so that network traffic of the migration passes through only one access switch. This shortens a length of a data transmission link, increases a migration rate, reduces migration traffic, and further relieves impact of virtual machine live migration in an entire cluster system on network load.

Figure 8:
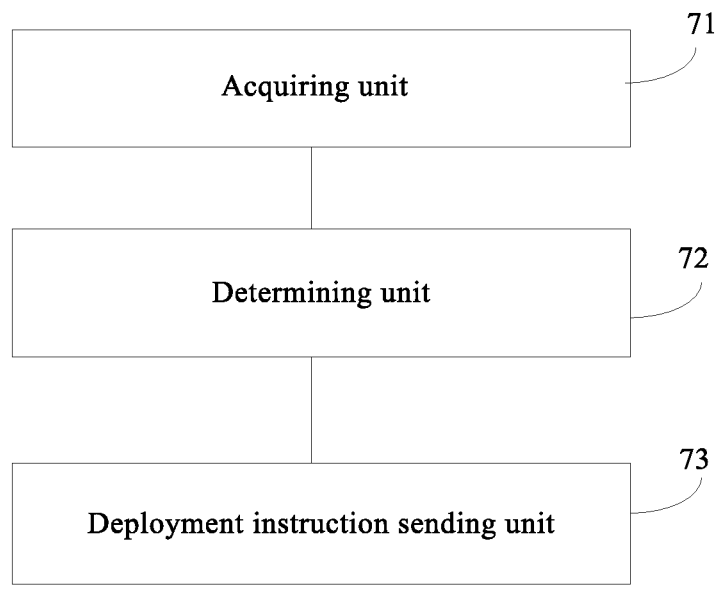
FIG. 8 is a schematic structural diagram of a server according to another embodiment of the present invention.

According to another aspect of the present invention, FIG. 8 shows a schematic structural diagram of a server according to another embodiment of the present invention. The server in this embodiment includes an acquiring unit 71, a determining unit 72, and a deployment instruction sending unit 73.

The acquiring unit 71 is configured to acquire load information of physical machines in all physical machine groups that share a same aggregation switch; the determining unit 72 is configured to determine a destination physical machine in all physical machine groups according to a first dynamic resource scheduling policy and the load information of the physical machines, where the destination physical machine is a physical machine whose load information is lower than a second threshold; and the deployment instruction sending unit 73 is configured to deliver, according to a deployment policy, a deployment instruction for deploying one or more virtual machines to the destination physical machine, so that the destination physical machine deploys a virtual machine according to the deployment instruction, so as to make load information of the destination physical machine on which the virtual machine is deployed lower than a first threshold, where the first threshold is higher than the second threshold.

Further, the foregoing deployment instruction sending unit 73 is further configured to, when it is determined that there are two or more than two destination physical machines, deliver the deployment instruction to a physical machine with the lowest load information.

The foregoing load information may include a resource utilization rate of a virtual machine and a resource utilization rate of a physical machine, where a resource includes a central processor, a memory, and a storage I/O rate, a network receiving/sending rate, or the like.

It may be learned from the foregoing embodiment that, a server in this embodiment performs deployment according to load information of physical machines, and can properly deploy virtual machines on physical machines under a same aggregation switch and can balance load of the physical machines, so as to reduce the times of subsequent virtual machine migration.

Particularly, when a virtual machine is created in a cluster system, an appropriate location is automatically selected for the virtual machine. That is, virtual machines are evenly distributed to different physical machine groups according to a load status.

According to another aspect of the present invention, an embodiment of the present invention further provides a cluster system, where the cluster system includes multiple physical machine groups and the server according to any one of the embodiments of the present invention, where the server has a communications connection with each physical machine in the multiple physical machine groups.

In this embodiment, physical machines in the cluster system are grouped based on connections to a same switch, that is, physical machines in one physical machine group are jointly connected to one switch.

In addition, the cluster system may acquire resource data in the cluster. The resource data may be load information of the foregoing physical machines, where the load information includes a resource utilization rate of a virtual machine and a resource utilization rate of a physical machine and a resource includes a processor (for example, a CPU or DSP), a memory, a storage I/O rate, a network receiving/sending rate or the like, and the load information may be collected at a fixed interval.

More specifically, the server may be the server shown in FIG. 7 and can execute any one of the method embodiments shown in FIG. 2B, FIG. 3B, FIG. 4B, and FIG. 5B, where an implementation principle thereof is similar and is not repeatedly described herein.

Alternatively, the server may be the server shown in FIG. 8 and can execute a technical solution of the method embodiment shown in FIG. 6B, where an implementation principle thereof is similar and is not repeatedly described herein.

Alternatively, the server may be a function set that integrates the server shown in FIG. 7 and the server shown in FIG. 8.

It should be noted that, "first" and "second" in the foregoing descriptions of the embodiments are merely used for ease of differentiation, and are not intended to limit a sequence or order.

Persons of ordinary skill in the art may understand that all or a part of the steps of the method embodiments may be implemented by program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended to describe the technical solutions of the present invention other than to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A virtual machine live migration method, comprising:
    acquiring, by a managing server, loads of first physical machines in a first physical machine group and of second physical machines in a second physical machine group, wherein the first physical machines in the first physical machine group share a first access switch, wherein the second physical machines in the second physical machine group share a second access switch, and wherein the first physical machines and the second physical machines share a same aggregation switch;
    determining, by the managing server, a source physical machine and a destination physical machine in the first physical machine group according to loads of the first physical machines in the first physical machine group, wherein the source physical machine is a physical machine whose load exceeds a first threshold, and the destination physical machine is a physical machine whose load is lower than a second threshold, wherein the first threshold is higher than the second threshold;
    delivering, in response to determining, according to the loads, that all first physical machines and that all second physical machines are destination physical machines, a first migration instruction to N destination physical machines of the first physical machines with a lowest load according to an energy saving and emission reduction policy, so that the N destination physical machines with the lowest load migrate, according to the first migration instruction, all virtual machines on the N destination physical machines to at least one second destination physical machine of the first physical machines, so as to make load of each of the at least one second destination physical machine lower than the first threshold, wherein the first migration instruction achieves a resource objective within the first physical machine group, wherein N is an integer greater than or equal to 1, and N is smaller than a total number of destination physical machines in the first physical machine group; and
    delivering, in response to determining that the first migration instruction fails to achieve the resource objective within the first physical machine group, a second migration instruction to the N destination physical machines of the first physical machines, so that the N destination physical machines migrate, according to the second migration instruction, all virtual machines on the N destination physical machines to at least one third destination physical machine of the second physical machines, so as to make load of each of the at least one third destination physical machine lower than the first threshold.

2. A virtual machine live migration method, comprising:
    acquiring loads of physical machines in a first physical machine group, wherein the physical machines in the first physical machine group share a same access switch;
    acquiring loads of physical machines in a second physical machine group that shares a same aggregation switch with the first physical machine group;
    determining a source physical machine and a destination physical machine in the first physical machine group according to the loads of the physical machines in the first physical machine group, wherein the source physical machine is a physical machine whose load exceeds a first threshold;
    determining a destination physical machine in the second physical machine group according to the loads of the physical machines in the second physical machine group; and
    delivering a first migration instruction to the source physical machine in the first physical machine group according to a first dynamic resource scheduling policy, wherein the first migration instruction comprises an identifier of a virtual machine to be migrated and an identifier of the destination physical machine in the second physical machine group, so that the source physical machine in the first physical machine group migrates, according to the first migration instruction, a virtual machine on the source physical machine and corresponding to the identifier of the virtual machine to be migrated to the destination physical machine in the second physical machine group and corresponding to the identifier of the destination physical machine, wherein load of the destination physical machine in the second physical machine group is lower than the first threshold, and load of the source physical machine is lower than the first threshold after the migration.

3. The method according to claim 2, wherein the second physical machine group comprises two or more destination physical machines, a first destination physical machine to which a virtual machine on the source physical machine in the first physical machine group is migrated is a physical machine with a lowest load in the second physical machine group.

4. The method according to claim 2, further comprising:
delivering a second migration instruction to all physical machines in the first physical machine group according to an energy saving and emission reduction policy, wherein the second migration instruction comprises an identifier of a destination physical machine in the second physical machine group, so that all physical machines in the first physical machine group migrate, according to the second migration instruction, all virtual machines on all physical machines in the first physical machine group to a destination physical machine in the second physical machine group and corresponding to the identifier of the destination physical machine, wherein load of the destination physical machine is lower than the first threshold after the migration; or
delivering a third migration instruction to all physical machines in the second physical machine group according to an energy saving and emission reduction policy, wherein the third migration instruction comprises an identifier of a destination physical machine in the first physical machine group, so that all physical machines in the second physical machine group migrate, according to the third migration instruction, all virtual machines on all destination physical machines in the second physical machine group to a destination physical machine in the first physical machine group and corresponding to the identifier of the destination physical machine, wherein load of the destination physical machine is lower than the first threshold after the migration.

5. The method according to claim 1, wherein the first physical machine group comprises two or more destination physical machines, a first destination physical machine to which a virtual machine on the source physical machine is migrated is a physical machine with the lowest load.

6. The method according to claim 1, wherein the first migration instruction comprises an identifier of the at least one second destination physical machine, so that the N destination physical machines with the lowest load migrate, according to the first migration instruction and to the identifier, all virtual machines on the N destination physical machines to the at least one second destination physical machine identified by the identifier.

7. The method according to claim 1, wherein the load comprises a processor use rate, a memory occupation rate, a storage I/O rate or a network receiving/sending rate of a physical machine.

8. The method of claim 1, further comprising:
delivering, by the managing server and in response to determining the source physical machine and the destination physical machine, and further in response to determining that a single physical machine of a plurality of the first physical machine group is the destination physical machine, a third migration instruction to the source physical machine according to a second dynamic resource scheduling policy, wherein the third migration instruction comprises an identifier of a virtual machine to be migrated and an identifier of the destination physical machine, so that the source physical machine migrates, according to the third migration instruction, a virtual machine on the source physical machine and corresponding to the identifier of the virtual machine to be migrated to the destination physical machine corresponding to the identifier of the destination physical machine, wherein load of the destination physical machine and the source physical machine are lower than the first threshold after migration; and
delivering, according to an energy saving and emission reduction policy, and in response to determining a plurality of destination physical machines, and further in response to determining that fewer than all physical machines in the first physical machine group are destination physical machines, a fourth migration instruction to a first destination physical machine of the plurality of destination physical machines having the lowest load in the plurality of destination physical machines, wherein the fourth migration instruction comprises an identifier of the at least one second destination physical machine that is of the plurality of destination physical machines, and that has a load that is higher than the load of the first destination physical machine, the fourth migration instruction sent to the first destination physical machine causing the first destination physical machine to migrate, according to the fourth migration instruction, all virtual machines on the first destination physical machine to the at least one second destination physical machine while maintaining the load of the at least one second destination physical machine below the first threshold, wherein the migrating all of the virtual machines to the at least one second destination physical machine permits the first destination physical machine to be powered off after the migrating.

9. A virtual machine deployment method, comprising:
acquiring, by a managing server, loads of physical machines in a plurality of physical machine groups, wherein physical machines in each physical machine group of the plurality of physical machine groups share a same access switch, and wherein the physical machine groups of the plurality of physical machine groups share a same aggregation switch;
determining, respectively, by the managing server, a destination physical machine in each physical machine group of the plurality of physical machine groups according to a first dynamic resource scheduling policy and the loads of the physical machines, wherein the destination physical machine selected in each physical machine group is a physical machine whose load is lower than a second threshold; and
delivering, by the managing server according to a deployment policy, a deployment instruction for deploying one or more virtual machines to a target destination physical machine of the determined destination physical machines having a lowest load, so that the target destination physical machine deploys a virtual machine according to the deployment instruction, wherein load of the target destination physical machine is lower than a first threshold after the deployment, wherein the first threshold is higher than the second threshold.

10. The method according to claim 9, wherein the load comprises a processor use rate, a memory occupation rate, a storage I/O rate or a network receiving/sending rate of a physical machine.

11. A server, comprising:
a processor; and a non-transitory computer readable medium connected to the processor and having stored thereon instructions that instruct the processor to:

acquire loads of first physical machines in a first physical machine group and of second physical machines in a second physical machine group, wherein the first physical machines in the first physical machine group share a first access switch, wherein the second physical machines in the second physical machine group share a second access switch, and wherein the first physical machines and the second physical machines share a same aggregation switch;

determine a source physical machine and a destination physical machine in the first physical machine group according to the loads of the physical machines in the first physical machine group, wherein the source physical machine is a physical machine whose load exceeds a first threshold, and the destination physical machine is a physical machine whose load is lower than a second threshold, wherein the first threshold is higher than the second threshold; and deliver, in response to determining, according to the loads, that all first physical machines and that all second physical machines are destination physical machines, a first migration instruction to N destination physical machines of the first physical machines with a lowest load according to an energy saving and emission reduction policy, so that the N destination physical machines with the lowest load migrate, according to the first migration instruction, all virtual machines on the N destination physical machines to at least one second destination physical machine of the first physical machines, so as to make load of the destination physical machine lower than the first threshold, wherein the first migration instruction achieves a resource objective within the first physical machine group, wherein N is an integer greater than or equal to 1, and N is smaller than a total number of destination physical machines in the first physical machine group; and deliver, in response to determining that the first migration instruction fails to achieve the resource objective within the first physical machine group, a second migration instruction to the N destination physical machines of the first physical machines, so that the N destination physical machines migrate, according to the second migration instruction, all virtual machines on the N destination physical machines to at least one third destination physical machine of the second physical machines, so as to make load of each of the at least one third destination physical machine lower than the first threshold.

12. The server according to claim 11, wherein, when it is determined that there are two or more than two destination physical machines in the first physical machine group, a physical machine with the lowest load is selected as a first destination physical machine to which a virtual machine on the source physical machine is migrated.

13. The server according to claim 11, wherein the load comprises a processor use rate, a memory occupation rate, a storage I/O rate or a network receiving/sending rate of a physical machine.

14. The server according to claim 11, wherein the server is disposed in a cluster system, wherein the cluster system comprises multiple physical machine groups, and wherein the server has a communications connection with each physical machine in the multiple physical machine groups.

15. The server of claim 11, where the instructions further comprise instructions to:

deliver, in response to determining the source physical machine and the destination physical machine, and further in response to determining that a single physical machine of a plurality of the first physical machine group is the destination physical machine, a third migration instruction to the source physical machine according to a dynamic resource scheduling policy, wherein the third migration instruction comprises an identifier of a virtual machine to be migrated and an identifier of the destination physical machine, so that the source physical machine migrates, according to the third migration instruction, a virtual machine on the source physical machine and corresponding to the identifier of the virtual machine to be migrated to the destination physical machine corresponding to the identifier of the destination physical machine, wherein load of the destination physical machine and the source physical machine are lower than the first threshold after migration; and deliver, according to an energy saving and emission reduction policy and in response to determining a plurality of destination physical machines, and further in response to determining that fewer than all physical machines in the first physical machine group are destination physical machines, a fourth migration instruction to a first destination physical machine of the plurality of destination physical machines having the lowest load in the plurality of destination physical machines, wherein the fourth migration instruction comprises an identifier of the at least one second destination physical machine that is of the plurality of destination physical machines, and that has a load that is higher than the load of the first destination physical machine, the fourth migration instruction sent to the first destination physical machine causing the first destination physical machine to migrate, according to the fourth migration instruction, all virtual machines on the first destination physical machine to the at least one second destination physical machine while maintaining the load of the at least one second destination physical machine below the first threshold, wherein the migrating all of the virtual machines to the at least one second destination physical machine permits the first destination physical machine to be powered off after the migrating.

16. A server, comprising:
a processor; and
a non-transitory computer readable medium connected to the processor and having stored thereon instructions that instruct the processor to:

acquire loads of physical machines in a first physical machine group, wherein the physical machines in the first physical machine group share a same access switch;

acquire loads of physical machines in a second physical machine group that shares a same aggregation switch with the first physical machine group;

determine a source physical machine and a destination physical machine in the first physical machine group according to a first dynamic resource scheduling policy and the loads of the physical machines in the first physical machine group, wherein the source physical machine is a physical machine whose load exceeds a first threshold;

determine a destination physical machine in the second physical machine group according to the first dynamic resource scheduling policy and the load of the physical machines in the second physical machine group; and deliver a first migration instruction to the source physical machine in the first physical machine group according to a third dynamic resource scheduling policy, wherein the first migration instruction comprises an identifier of a virtual machine to be migrated and an identifier of the destination physical machine in the second physical machine group, so that the source physical machine in the first physical machine group migrates, according to the first migration instruction, a virtual machine on the source physical machine and corresponding to the identifier of the virtual machine to be migrated to the destination physical machine in the second physical machine group and corresponding to the identifier of the destination physical machine, wherein load of the destination physical machine in the second physical machine group is lower than the first threshold, and load of the source physical machine is lower the first threshold after the migration.

17. The server according to claim 16, wherein, when it is determined that there are two or more than two destination physical machines in the second physical machine group, a physical machine with a lowest load in the second physical machine group is selected as a first destination physical machine to which a virtual machine on the source physical machine in the first physical machine group is migrated.

18. The server according to claim 16, wherein the processor is further configured to:

deliver a second migration instruction to all physical machines in the first physical machine group according to an energy saving and emission reduction policy, wherein the second migration instruction comprises an identifier of a destination physical machine in the second physical machine group, so that all physical machines in the first physical machine group migrate, according to the second migration instruction, all virtual machines on all physical machines in the first physical machine group to a destination physical machine in the second physical machine group and corresponding to the identifier of the destination physical machine, wherein load of the destination physical machine is lower than the first threshold after the migration; or deliver a third migration instruction to all physical machines in the second physical machine group according to an energy saving and emission reduction policy, wherein the third migration instruction comprises an identifier of a destination physical machine in the first physical machine group, so that all physical machines in the second physical machine group migrate, according to the third migration instruction, all virtual machines on all physical machines in the second physical machine group to a destination physical machine in the first physical machine group and corresponding to the identifier of the destination physical machine, wherein load of the destination physical machine is lower than the first threshold after the migration.

19. A server, comprising:

a processor; and a non-transitory computer readable medium connected to the processor and having stored thereon instructions that instruct the processor to:

acquire loads of physical machines in a plurality of physical machine groups, wherein physical machines in each physical machine group of the physical machine groups share a same access switch, and wherein the physical machine groups of the plurality of physical machine groups share a same aggregation switch;

determine, respectively, a destination physical machine in each physical machine group of the plurality of physical machine groups according to a first dynamic resource scheduling policy and the loads of the physical machines, wherein the destination physical machine selected in each physical machine group is a physical machine whose load is lower than a second threshold; and deliver, according to a deployment policy, a deployment instruction for deploying one or more virtual machines to a target destination physical machine of the determined destination physical machines having a lowest load, so that the target destination physical machine deploys a virtual machine according to the deployment instruction, wherein load of the target destination physical machine is lower than a first threshold after deployment, wherein the first threshold is higher than the second threshold.

20. The server according to claim 19, wherein the load comprises a processor use rate, a memory occupation rate, a storage I/O rate or a network receiving/sending rate of a physical machine.

\* \* \* \* \*